US012143312B2

(12) United States Patent
Ivanov et al.

(10) Patent No.: US 12,143,312 B2
(45) Date of Patent: Nov. 12, 2024

(54) ON-DEMAND RESOURCE CAPACITY IN A SERVERLESS FUNCTION-AS-A-SERVICE INFRASTRUCTURE

(71) Applicant: VMware LLC, Palo Alto, CA (US)

(72) Inventors: Angel Ivanov, Sofia (BG); Antonio Filipov, Sofia (BG); Yavor Syarov, Sofia (BG); Radoslav Bonev, Sofia (BG)

(73) Assignee: VMware LLC, Palo Alto, CA (US)

( * ) Notice: Subject to any disclaimer, the term of this patent is extended or adjusted under 35 U.S.C. 154(b) by 39 days.

(21) Appl. No.: 17/587,192

(22) Filed: Jan. 28, 2022

(65) Prior Publication Data

US 2023/0300086 A1  Sep. 21, 2023

(51) Int. Cl.
*H04L 47/70* (2022.01)
*H04L 47/74* (2022.01)
*H04L 47/762* (2022.01)
*H04L 47/78* (2022.01)

(52) U.S. Cl.
CPC .......... *H04L 47/822* (2013.01); *H04L 47/741* (2013.01); *H04L 47/762* (2013.01); *H04L 47/781* (2013.01)

(58) Field of Classification Search
CPC ... H04L 47/822; H04L 47/741; H04L 47/762; H04L 47/781
See application file for complete search history.

(56) References Cited

U.S. PATENT DOCUMENTS

| | | | |
|---|---|---|---|
| 2019/0208009 A1* | 7/2019 | Prabhakaran | H04L 67/51 |
| 2020/0225983 A1* | 7/2020 | Jung | G06F 9/5027 |
| 2021/0263779 A1* | 8/2021 | Haghighat | G06F 21/78 |
| 2021/0326299 A1* | 10/2021 | Guim Bernat | H04L 67/1097 |

* cited by examiner

*Primary Examiner* — Farzana B Huq
(74) *Attorney, Agent, or Firm* — King Intellectual Asset Management

(57) ABSTRACT

Various aspects are disclosed for optimization of dependent systems for serverless frameworks that facilitate a function-as-a-service (FaaS). In some examples, an agent can be installed on a dependent system and collect resource consumption data that is reported to a management service. The management service can throttle requests submitted to the FaaS or scale up the infrastructure depending upon the resource consumption data.

20 Claims, 3 Drawing Sheets

ON-DEMAND RESOURCE CAPACITY IN A SERVERLESS FUNCTION-AS-A-SERVICE INFRASTRUCTURE

BACKGROUND

Enterprises can develop functions that perform a task or service for enterprise users or enterprise customers. The enterprise can provide access to these functions through applications hosted on data centers. Data centers include various physical and virtual components that can host applications and web services, cloud computing environments, virtualization environments, as well as other computing systems. For instance, computer virtualization relates to the creation of a virtualized version of a physical device, such as a server, a storage device, a central processing unit (CPU), a graphics processing unit (GPU), or other computing resources. However, operating or managing a data center can involve maintaining hundreds to thousands of virtual machines as well as hardware of host machines, which include CPUs, GPUs, and other physical hardware. As a result, enterprises can seek cloud computing options that do not require time consuming data center management.

While access to enterprise functions can be provided through cloud services, the functions nevertheless utilize backend hardware once invoked, for example, to provide storage, compute, or graphics. Existing technologies can make inefficient use of hardware resources, for example, by overloading or underloading the hardware resources as enterprise functions are invoked.

Functions-as-a-service (FaaS) is a computing model in which application developers create and upload modular chunks of application functionality (referred to as "functions") to a cloud-based FaaS infrastructure. The FaaS infrastructure is responsible for executing each function as needed on an appropriate host system of the infrastructure in an independent and scalable manner.

A FaaS is often invoked by a user through a front-end site or application programming interface (API) through which users can invoke the function. The user need not be aware of or maintain the computing infrastructure on which the FaaS is implemented. However, the service should provide ample processor, memory, and network resources to provide an acceptable response time for requests made to the FaaS.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to optimization of dependent systems for serverless frameworks. Enterprises can utilize cloud computing options that do not require time consuming data center management. Serverless frameworks can provide a function as a service (FaaS). This arrangement can allow individual ephemeral functions to be invoked, rather than hosting persistent applications, to provide this functionality. These functions can execute in stateless containers and can be invoked multiple times. Hardware resources that support instances of function can be fully managed by a management service separate from the enterprise. However, existing technologies can make inefficient use of hardware resources, for example, by overloading or underloading the hardware resources as instances of the functions are invoked. The present disclosure provides a solution to obtain accurate analytics from the infrastructure pods on which a FaaS can be implemented so that resources can be scaled appropriately or requests can be throttled. Resources can be scaled or requests can be throttled to provide an acceptable service level for the FaaS or to ensure the uptime of the resources allocated to the infrastructure pods allocated to the FaaS.

In one example, the infrastructure resources allocated to the FaaS can be scaled upwards if it can be determined that additional resources are necessary to meet a particular service level agreement or desired response time. The resources can be scaled upwards until configurable maximum parameters are met, whether these parameters are cost, server capacity, memory resources, compute resources or other resources that might be needed to serve FaaS requests. Once a maximum scale of the infrastructure is reached, requests submitted to the FaaS can be throttled. In one example, requests from users of the FaaS can be queued and serviced on a first-come first-serve basis until an acceptable level of infrastructure resources are available within dependent systems that service the FaaS.

Figure 1:
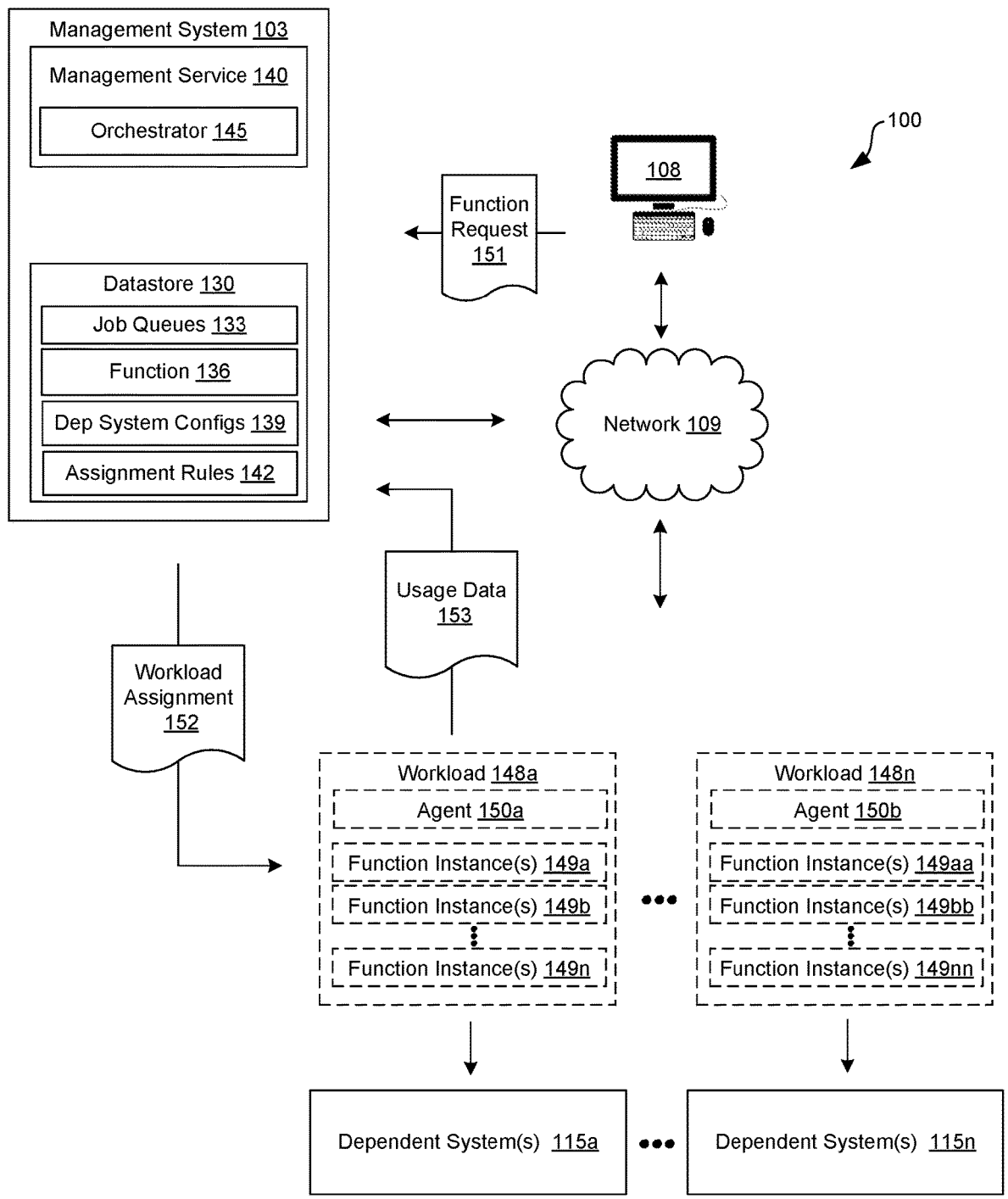
FIG. 1 is a drawing of an example of a networked computing environment that includes a management system, a client device, and dependent systems for a serverless framework.

Turning now to FIG. 1, an example of a networked environment 100 is shown. The networked environment 100 can include a management system 103, client device(s) 108, and various dependent systems 115a . . . 115n (collectively "dependent systems 115") in communication with one other over a network 109. The network 109 can include, for example, the Internet, intranets, extranets, wide area networks (WANs), local area networks (LANs), wired networks, wireless networks, other suitable networks, or any combination of two or more such networks.

The networks can include satellite networks, cable networks, Ethernet networks, telephony networks, and other types of networks. In some examples, the networked environment 100 can provide a public cloud computing environment, a private cloud computing environment, or a hybrid cloud computing environment. As such, the networked environment 100 can be referred to as a cloud computing environment.

The management system 103 can include a server computer or any other system providing computing capability. The management system 103 can provide access to functions for each of several different enterprises. While referred to in the singular, the management system 103 can include a plurality of computing devices that are arranged in one or more server banks, computer banks, or other arrangements. The management system 103 can include a grid computing resource or any other distributed computing arrangement. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above. The components executed on the management system 103 can include a management service 140 as well as other applications, services, processes, systems, engines, or functionality not discussed in detail herein. The management service 140 can be stored in the datastore 130 of the management system 103.

In various embodiments, the management system 103 can include a plurality of devices installed in racks which can make up a server bank, aggregate computing system, or a computer bank in a data center or other like facility. In some examples, the management system 103 can include high-availability computing systems. A high-availability computing system is a group of computing devices that act as a single system to provide a continuous and constant uptime. The devices in the management system 103 can include any number of physical machines, virtual machines, virtual appliances, and software, such as operating systems, drivers, hypervisors, scripts, and applications.

In some examples, a management system 103 can include a computing environment that includes hundreds or even thousands of physical machines, as well as virtual machines and other software implemented in devices stored in server racks, distributed geographically, and connected to one another through the network 109. It is understood that any virtual machine or other virtual appliance can be implemented using at least one physical device, such as a server or other computing device.

The management system 103 can utilize various dependent systems 115a . . . 115n to provide physical resources that enable the operation of workloads 148a . . . 148n (collectively "workloads 148"). For example, the workloads 148a and 148n can include the function instances 149a . . . 149n and 149aa . . . 149nn (collectively "function instances 149"), respectively. While referred to as function instances 149, each function instance 149 can be executed in a container such as a compute or init container as directed in conjunction with the orchestrator 145. Additionally, the workloads 148 can also include respective agents 150a, 150b that are running on respective workloads 148. The agents 150a, 150b represent a service or application running on respective workloads 148 to provide real time performance and infrastructure data as described by examples of the disclosure and is also individually referred to as an agent 150.

The agent 150 can be an application that is installed on a dependent system 115 and make operating system calls to ascertain usage data of a dependent system 115. In examples of this disclosure, an agent 150 can communicate with an operating system shell or an interface provided by the dependent system 115. The agent 150 can make operating system calls via the operating system shell to ascertain available memory, compute, and storage resources that are available on a respective dependent system 115.

The dependent systems 115 can include physical computing hardware including, servers, datastores, memories, and other storage devices, switches, routers, and other network devices, graphics cards having one or more GPUs, central processing units (CPUs), power supplies, and other devices. In various examples, the servers can include requisite physical hardware and software to create and manage virtualization infrastructure or a cloud computing environment. In some examples, the computing resources can also include virtual computing resources, such as virtual machines or other software.

The agent 150 can represent a service running on an operating system such as Linux that communicates with dependent system 115 tools to determine memory state or consumption, processor state, an identity of the currently running processes, network bandwidth usage, and other parameters associated with the resources being consumed within a dependent system 115. The data can be aggregated by the agent 150 and provided to the management service 140. The management service 140 can request the state of the resources in the dependent system 115 by submitting a request to a respective agent 150 running on the dependent system 115. In one scenario, the management service 140 can submit a request to multiple instances of the agent 150 running on multiple dependent systems 115 in a cluster that provide workloads 148 for a FaaS service.

The respective agents 150 running on the dependent systems 115 can return the state of the infrastructure, or the resource state of the dependent system 115 on which a particular management service 140 is running. The management service 140 can analyze the reported infrastructure state information obtained from agents 150 on the respective dependent systems 115 and determine whether to throttle requests serviced by the management service 140 on behalf of users, add capacity to the infrastructure or remove capacity from the infrastructure.

The management service 140 can add capacity to the infrastructure powering a FaaS by adding additional memory, compute, storage, or network resources to a cluster of dependent systems 115 powering the FaaS. For example, the management service 140 can add a dependent system 115 to the infrastructure if the infrastructure state information indicates that the resources of the infrastructure are constrained. In this sense, the management service 140 can scale up the infrastructure. In another example, the management service 140 can throttle requests that are submitted to the infrastructure if the infrastructure state information indicates that the resources of the infrastructure are constrained. The usage data 153 can include actual usage values and metrics for compute, memory, graphics, temporary storage, persistent storage, and other resources for an instance of a function 136. Errors and other metrics can also be provided in the usage data 153.

The datastore 130 can include memory of the management system 103, mass storage resources of the management system 103, or any other storage resources on which data can be stored by the management system 103. The datastore 130 can include memory and datastores for the dependent systems 115. For instance, the datastore 130 can include one or more relational databases, such as structure query language (SQL) databases, non-SQL databases, or other relational or non-relational databases. The data stored in the datastore 130, for example, can be associated with the operation of the various services or functional entities described below. The datastore 130 can include a database or other memory that includes, for example, a job queue 133, functions 136, dependent system configurations 139, and assignment rules 142, as well as other data not discussed herein.

The job queue(s) 133 can include the workloads 148, as well as the related function instances 149. A job queue 133 can store a list of the workloads 148 according to an order of priority. In some examples, once a memory limit for the job queue 133 is exceeded, the additional workloads 148 and related function instances 149 can be stored in a disk backed queue of the datastore 130.

The functions 136 can include function definitions for FaaS functions that can be invoked and instantiated on demand for an enterprise. For example, a function 136 can include code that receives an input, and performs an action or transforms the input into a desired output. An instance of a function 136 can be created in a compute or init container and can be ephemeral in that the management service 140 can create the instance of the function 136 and destroy it and its container once completed. The instance of the function 136 can be stateless, in that the instance itself does not remain in a persistent storage. However, while the instance of the function 136 is stateless, it can store and access persistent action logs, results, outputs, and other data in a persistent datastore that is separate from the instance of the function 136. In this way, both naturally stateless functions and state oriented functions can be considered stateless. The dependent systems 115 can include persistent datastores 130 that are utilized for instances created from the function 136. The dependent systems 115 can also include the physical hardware that provides compute, memory, graphics, temporary storage, persistent storage, and other resources for an instance of a function 136.

The function 136 can include a name of the function or a function identifier. The function 136 can also include executable function code. The function code can be code that complies with a FaaS API, such as REST API, OpenFaaS API or another API. The function 136 can also include a trigger or event criteria which if met will tell the platform to deploy and execute the function 136. An event can include receiving an external API call at an endpoint of the management service 140 defined in the function 136, for example, from a client device 108. For example, a function request 151 can be transmitted by a client device 108 to the management service 140. The function request 151 can include the function identifier, and an identifier or address of the endpoint for the particular function 136. The function request 151 can request data that is associated with or provided by the function 136, and the management service 140 can identify the function based on the requested data. The management service 140 can include an API gateway, for example, a REST API gateway, OpenFaaS API gateway, or another API gateway that is configured to receive API calls. An event can also include a notification event triggered as a result of an operation, for example, creation of a virtual machine, execution of another function 136, and other enterprise operations.

Each function 136 can be associated with a particular enterprise. The management service 140 can include, for each function 136, a service level agreement (SLA) that indicates a level of service at which the function 136 should be provided according to a metric. For example, an enterprise can contract for a function 136 to be provided on demand, and the function SLA can indicate a predetermined percentage of uptime for the function 136 when requested, or a specified maximum wait time to create an instance of the function 136, or a time period to complete the function 136. The management service 140 can utilize the function SLA to determine whether an additional function instance 149 of the function 136 should be created in order to meet or exceed the function SLA. A function SLA can also include metrics that are associated with dependent systems that it utilizes. For example, data capacity and threshold conditions for memory utilization as a percentage of the data capacity, a compute capacity and threshold conditions as a value or percentage of the compute capacity, a graphics compute capacity and threshold conditions as a value or percentage of the graphics compute capacity, a network capacity and threshold conditions as a value or percentage of the network capacity. A threshold condition can indicate whether a value for a particular function 136 is greater than, less than, or equal to (or a combination thereof) a threshold level. The management service 140 can utilize function SLAs to determine whether to spawn or create an additional function instance 149. If any one of the function SLAs are triggered, for example, for any one of the dependent system metrics, then an additional function instance 149 can be spawned or created.

The dependent system configurations 139 can include a hardware configuration and a software configuration for various dependent systems 115. A hardware configuration can include a list of system parameters along with acceptable thresholds for the dependent system 115. For example, a dependent system 115 can include one or more of a datastore, a computing device, a graphics device, a network device, an output device, an input device, or other devices. For a datastore, the hardware configuration can include a data capacity and an acceptable threshold conditions for memory utilization, for example, in inputs/outputs (I/O) or a percentage of the data capacity. For a computing device or CPU, the hardware configuration can include a compute capacity and acceptable threshold conditions as a value or percentage of the compute capacity. For a graphics device or GPU, the hardware configuration can include a graphics compute capacity and acceptable threshold conditions as a value or percentage of the graphics compute capacity. A network device can include a network capacity and acceptable threshold conditions as a value or percentage of the network capacity. A threshold condition can indicate whether acceptable operation is greater than, less than, or equal to (or a combination thereof) a threshold level. A software configuration can include programs, operating systems, and other instructions executed by a dependent system 115, for example, to provide compute, memory, graphics, and network resources for a function 136. The acceptable thresholds can also be referred to as dependent system SLAs, and the acceptable thresholds can be determined or defined according to an SLA with an enterprise. The management service 140 can analyze acceptable thresholds of dependent system SLAs to determine an optimal or maximum number of function instances 149 to assign to a particular dependent system 115. Accordingly, the management service 140 can consider two levels of SLAs including function SLAs and dependent system SLAs.

The dependent system configurations 139 can also include a type or category for each of the dependent systems 115 or components of the dependent systems 115. For example, a category or type can include a model number or hardware identifier for a dependent system 115 or a component. Once a dependent system configuration 139 is established for a particular dependent system 115 or component, additional dependent systems 115 of the same type can be associated with the same type or category.

The assignment rules 142 can indicate a maximum number of instances of a particular function 136 that can be executed concurrently on a particular dependent system 115. As discussed in further detail below, the management service 140 can determine this maximum number of instances based on usage data 153 obtained from an agent 150 regarding a dependent system 115 in the infrastructure. Once the maximum number of instances is determined (for example, to optimize performance according to the acceptable thresholds), the management service 140 can associate the maximum number of instances with the type of the dependent system 115. The management service 140 can assign one or more instances of the function 136 to a particular dependent system 115, for example, by transmitting a workload assignment 152. In this way, the management service 140 can throttle requests that are serviced by the FaaS implemented by examples of the disclosure.

The assignment rules 142 can also track the SLA for each function 136. The function SLA can be utilized to determine whether to create a new function instance 149. The assignment rules 142 can include rules that determine whether an additional dependent system 115 should be allocated to an enterprise in order to maintain the SLA for the function 136. For example, a history or log stored by the managements service 140 can indicate a total number of instances of a function 136 that are utilized by the enterprise over a period of time, a spawn rate for the function 136, or a request rate for the function 136.

The components executed on the management system 103 can include, for example, a management service 140 as well as other applications, services, processes, systems, engines, or functionality not discussed in detail herein. The management service 140 can be executed to oversee the operation of the networked environment 100 through management of the dependent systems 115 as well as the physical and virtual computing resources that make up the dependent systems 115. In some examples, an enterprise, organization, or other entity can operate the management service 140 to oversee or manage the operation of devices in racks, such as servers, switches, datastores, CPUs, GPUs, power supplies, cooling systems, and other components.

The management service 140 can also provide a front-end service that receives a function request 151 from a client device 108 and routes the request to the infrastructure, or a dependent system 115. In some examples, the management service 140 can include a container orchestrator 145. Traditionally, the container orchestrator 145 can oversee the creation and destruction of live and test workloads 148 such as the function instances 149 that utilize dependent systems 115. Additionally, in some examples, the container orchestrator 145 can organize, prioritize, distribute, and balance function instances that are assigned to utilize the dependent systems 115. The container orchestrator 145 can include Kubernetes (k8s), Swarm, Mesos, or another orchestrator.

The various physical and virtual components of the dependent systems 115 can process workloads 148. A workload 148 can refer to the collective function instances 149 that are assigned to a particular dependent system 115. The workloads 148 can be associated with virtual machines, public cloud services, private cloud services, hybrid cloud services, or other software executing on the dependent systems 115. For instance, the workloads 148 can include function instances 149 to be processed to provide function-as-a-service (FaaS) on behalf of an enterprise through public cloud services, private cloud services, hybrid cloud services, or a combination thereof. In another example, the workloads 148 can include function instances 149 to be processed to provide employees of an enterprise with functions 136 through remote desktop sessions or other virtualized computing sessions. The workloads 148 can include tasks to be processed to provide serverless architecture. Serverless architecture can refer to the management system 103 providing FaaS for a function 136. In some cases, the serverless architecture can manage multiple functions 136 that collectively provide a larger service for the enterprise. The management service 140 can organize and execute the functions 136 in containers, and further provide persistent data for the functions 136 for example on dependent system 115, without requiring an enterprise developer or administrator to configure and maintain a proprietary server.

Figure 2:
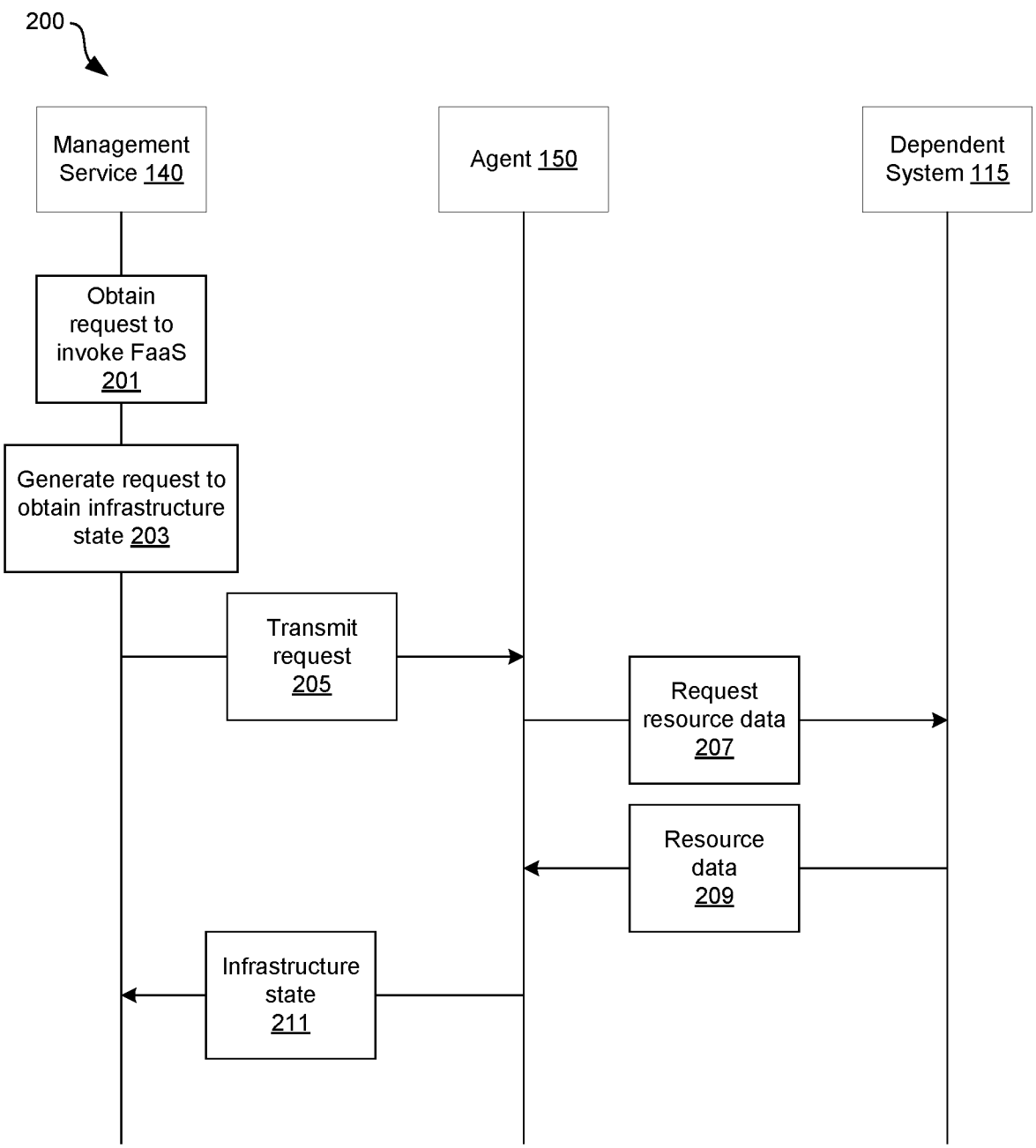
FIG. 2 is a sequence diagram illustrating examples of functionalities implemented by components of the networked computing environment of FIG. 1.

Referring next to FIG. 2, shown is a sequence diagram 200 that illustrates interactions between the management service 140, one or more instance of the agent 150, and one or more dependent system 115 on which the agent 150 is running. The ordering, separation, or segmentation of functionality as discussed herein is presented for illustrative purposes only.

The example of FIG. 2 represents an example of how the management service 140 can communicate with a single dependent system 115 to obtain infrastructure state information from the dependent system 115. However, in examples of the disclosure, the management service 140 can communicate with multiple agents 150 running within multiple dependent systems 115 that comprise a FaaS infrastructure to obtain infrastructure state information to make a determination about whether to take a remedial action on the infrastructure. The remedial action can include scaling up the infrastructure and/or throttling requests that are submitted by users to the FaaS facilitated by the management service 140 and the population of dependent systems 115.

At step 201, the management service 140 can obtain a request to execute a function. The request can be obtained from a client device 108 associated with a user of the FaaS. The request can include data or parameters associated with the function. The FaaS again represents a serverless computing architecture that is provided to users who wish to utilize the FaaS architecture for a computing task without having to provision a server or other resources to do so.

At step 203, management service 140 can generate a request to obtain infrastructure state data from the dependent systems 115 powering the FaaS. The management service 140 can generate a request for one or more of the respective dependent systems 115. In some cases, the request can be generated for all of the respective dependent systems 115 in the infrastructure powering the FaaS. The management service 140 can generate the respective requests to determine the capability of the infrastructure to service the requests submitted at step 201 as well as subsequent requests submitted to the management service 140.

At step 205, the management service 140 can transmit the request to the agent 150 running on the management service 140. The request can be submitted to multiple agents 150 running on multiple dependent systems 115. At step 207, the agent 150 can request resource utilization data from a dependent system 115 on which it is running. In one example, the dependent system 115 can represent a Linux server, and the agent 150 can obtain information using operating system shell commands about the available memory, CPU utilization, and network utilization. Additionally, the agent 150 can identify the number of processes currently running on the dependent system 115 that are devoted to executing a function provided by the FaaS infrastructure. The agent 150 can obtain information about currently running processes by utilizing operating system shell commands or other operating system tools.

At step 209, the dependent system 115 can provide the resource utilization data to the agent 150 in response to the operating system shell commands or other operating system tools invoked by the agent 150. At step 211, the agent 150 can provide the resource utilization data to the management service 140. In one example, the agent 150 can pre-process the utilization data and provide metrics as to how taxed or utilized the dependent system 115 is. For example, the agent 150 can indicate a number of processes devoted to running a function associated with the FaaS that are currently running on a respective dependent system 115. The agent 150 can also indicate a percentage of memory that is being consumed by the processes executing on the dependent system 115. In response to receiving the infrastructure state information, the management service 140 can make a determination as to whether a remedial action is required on the FaaS infrastructure to service the request or subsequent requests to the FaaS. The remedial action can include adding a dependent system 115 to a cluster servicing the FaaS or throttling requests submitted to the FaaS so that the dependent systems 115 in the cluster do not become overloaded.

Figure 3:
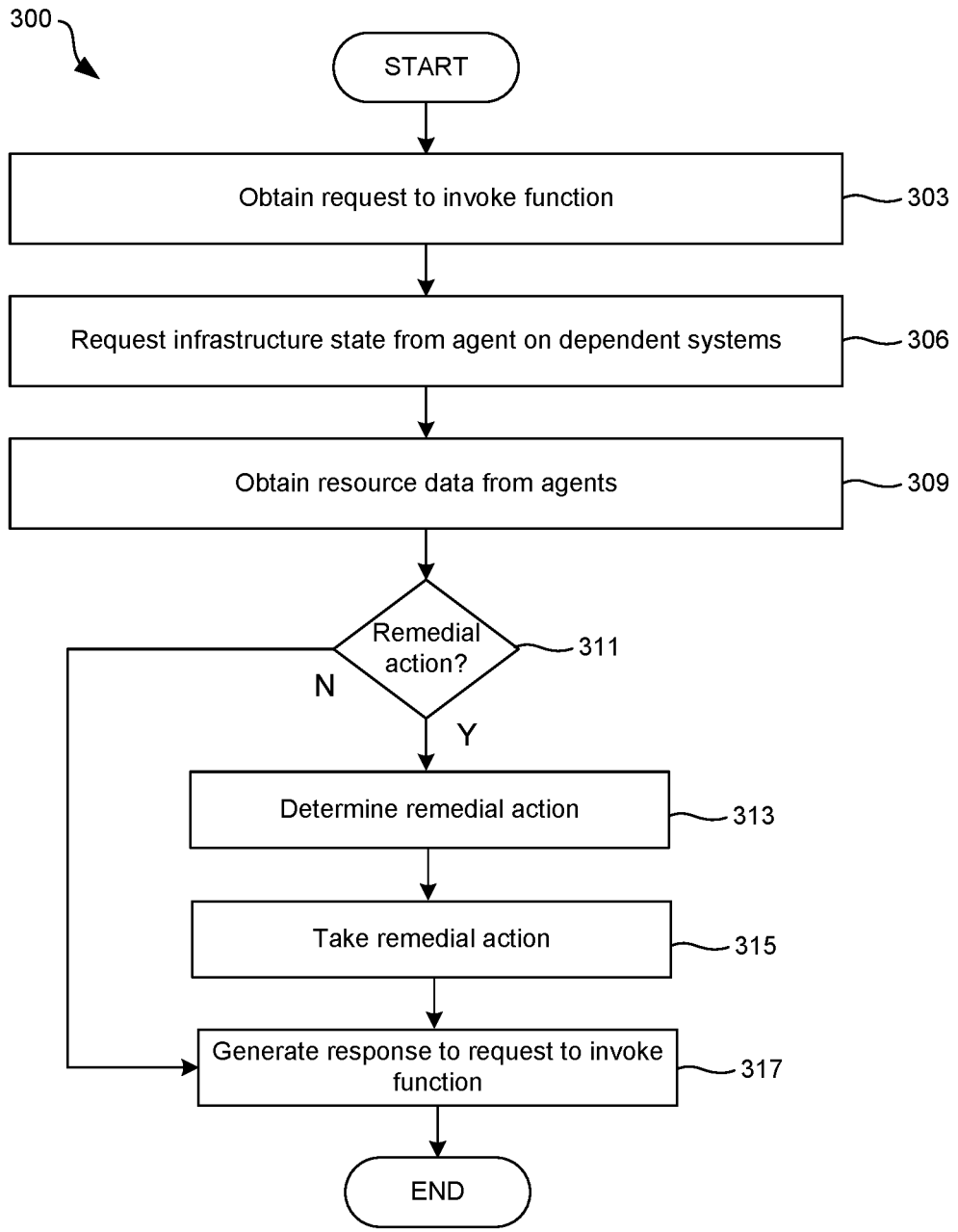
FIG. 3 is a flowchart illustrating examples of functionalities implemented by components of the networked computing environment of FIG. 1.

In FIG. 3, shown is a flowchart 300 that provides one example of the operation of a portion of the networked environment 100. The flowchart 300 can be viewed as depicting one example of determining whether a remedial action on a cluster of dependent systems 115 servicing the FaaS is required based upon interactions with agents 150 that are installed on respective dependent systems 115. The ordering, separation, or segmentation of functionality as discussed herein is presented for illustrative purposes only.

In step 303, the management service 140 can obtain a request to execute a function. The request can be obtained from a client device 108 associated with a user of the FaaS. The request can include data or parameters associated with the function. The FaaS again represents a serverless computing architecture that is provided to users who wish to utilize the FaaS architecture for a computing task without having to provision a server or other resources to do so.

At step 306, the management service 140 can request infrastructure state data from respective agents 150 that are installed on and running on respective dependent systems 115 that are powering workloads 148 that provide compute resources to the FaaS. An agent 150 can be an application, service, or binary that is installed on respective dependent systems 115 that can communicate with the operating system of the dependent system 115 to obtain resource utilization data. The agent 150 can request resource utilization data from a dependent system 115 on which it is running. In one example, the dependent system 115 can represent a Linux server, and the agent 150 can obtain information using operating system shell commands about the available memory, CPU utilization, and network utilization. Additionally, the agent 150 can identify the number of processes currently running on the dependent system 115 that are devoted to executing a function provided by the FaaS infrastructure. The agent 150 can obtain information about currently running processes by utilizing operating system shell commands or other operating system tools.

At step 309 the management service 140 can obtain resource utilization data from respective agents 150 running on respective dependent systems 115. For example, the utilization data can indicate how taxed or utilized the dependent system 115 is. For example, the agent 150 can indicate a number of processes devoted to running a function associated with the FaaS that are currently running on a respective dependent system 115. The agent 150 can also indicate a percentage of memory that is being consumed by the processes executing on the dependent system 115.

At step 311, the management service 140 can determine whether a remedial action should be taken on the cluster of dependent systems 115 servicing the FaaS. The management service 140 can make the determination by assessing whether the resource consumption data obtained from the agents 150 from the dependent systems 115 indicate that one or more of the dependent systems 115 are at or nearing full utilization. The management service 140 can determine that a dependent system 115 is at or nearing full utilization based upon the memory consumption, CPU utilization, network bandwidth consumption, or other data reported by the agent 150 to the management service 140. The management service 140 can also make this determination based upon an indication of the number of processes that are currently running on the dependent system 115 as reported by the agent 150.

In one example, the management service 140 can determine that a dependent system 115 is at or near full utilization if the memory consumption of the dependent system 115 is at or above a threshold utilization, such as a percentage of the overall memory resources of the dependent system 115. The management service 140 can determine that a dependent system 115 is at or near full utilization if the CPU utilization of the dependent system 115 is at or above a threshold utilization, such as a percentage of the overall CPU resources of the dependent system 115. The management service 140 can determine that a dependent system 115 is at or near full utilization if the number of running processes devoted to executing a function associated with the FaaS on the dependent system 115 is at or above a threshold number. In one example, the management service 140 can multiply the number of running processes devoted to executing a function associated with the FaaS by an amount of memory consumed by each process, or an average amount of memory consumed by a process associated with the FaaS, to determine the memory utilization of the dependent system 115. The management service 140 can then determine whether the memory utilization of the dependent system 115 approaches a threshold. If the dependent system 115 is at or near utilization, the management service 140 can determine that a remedial action should be taken, and the process can proceed from step 311 to step 313. If management service 140 determines that no remedial action should be taken, the process proceed from step 311 to 317.

At step 313, the management service 140 can determine a remedial action to alleviate one or more dependent system 115 being at or near full utilization. The remedial action can involve one or both of adding a dependent system 115 to a cluster of dependent systems 115 servicing the FaaS or throttling the servicing of requests that are submitted to the management service 140 from client devices 108. In one example, the management service 140 can provision a new dependent system 115 in a data center or a cloud computing environment unless the cluster of dependent systems 115 in the cluster is at or near a maximum quantity.

At step 315, the management service 140 can take the remedial action determined at step 313. The management service 140 can add dependent systems 115 to the cluster by invoking APIs in a data center or a cloud environment to provision additional computing resources that are assigned to the cluster. The management service 140 can throttle requests submitted to the management service 140 by slowing the rate at which requests are serviced by the FaaS. In one example, the management service 140 can queue requests submitted to the FaaS so that requests are serviced at a rate specified by the assignment rules 142.

At step 317, the management service 140 can generate a response to the request submitted to the FaaS by a client device 108. The response can include a result of the function execution by one or more of the workloads 148. The response can be transmitted to the client device 108. Thereafter, the process can proceed to completion.

Stored in the memory device are both data and several components that are executable by the processor. Also stored in the memory can be a datastore 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the management service 140. These client devices 108 can include a display upon which a user interface can be rendered. In some examples, the user interface can be generated using user interface data provided by the management system 103. The client device 108 can also include one or more input/output devices that can include, for example, a capacitive touchscreen or other type of touch input device, fingerprint reader, or keyboard.

Although the management service 140 and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A the system comprising:
at least one computing device comprising at least one processor; and
a memory comprising executable that when executed by the at least one processor, cause the at least one computing device to perform operations comprising:
receiving, by the computing device, a first request to invoke a function provided as a function-as-a-service (FaaS);
generating, by the computing device, a second request to obtain a state of a plurality of dependent systems in a cluster providing infrastructure for the FaaS, each dependent system being a virtual computer implemented on a physical device using hypervisor software;
transmitting, by the computing device, the second request to a plurality of agents, each of the plurality of agents running on a respective dependent system of the plurality of dependent systems;

obtaining, by the computing device and from the plurality of agents, a plurality of responses to the second request, each of the plurality of responses indicating resource consumption in a respective dependent system of the plurality of dependent systems;

analyzing, by the computing device, the plurality of responses from the plurality of agents to determine whether the resources of the FaaS infrastructure are constrained;

determining, by the computing device and based at least in part on a determination that the resources of the FaaS infrastructure are constrained, whether a number of dependent systems in the cluster is at a maximum number;

adding to the cluster, by the computing device and in response to a determination that the number of dependent systems in the cluster is not at a maximum number, an additional dependent system comprising an additional VM, by invoking an API to provision additional resources for the additional dependent system; and generating, by the computing device, a response to the first request to invoke the function.

2. The system of claim 1, wherein the resource consumption in each respective dependent system specifies system parameters of the respective dependent system, comprising: a number of running processes executing the function, a network utilization, a CPU utilization, or a memory utilization.

3. The system of claim 1, the operations further comprising:
throttling the rate at which responses to requests submitted to the FaaS are generated.

4. The system of claim 3, the operations further comprising:
determining that the number of dependent systems in the cluster is at the maximum number;
wherein throttling the rate at which responses to requests submitted to the FaaS are generated comprises:
throttling the rate in response to a determination that the number dependent systems in the cluster is at the maximum number.

5. The system of claim 1, wherein:
receiving a request to invoke a function comprises:
receiving the request via an API call at an API gateway; and
generating a response to the request to invoke the function comprises:
invoking an ephemeral executing in a stateless container running as a workload on one of the dependent systems.

6. The system of claim 1, the operations further comprising:
creating a new compute container on the additional dependent system for execution of the FaaS; and
executing the agent within the compute container.

7. The system of claim 1, wherein the plurality of dependent systems comprises a first dependent system, the operations further comprising:
determining a maximum number of instances of the function that may be executed concurrently on the first dependent system; and
associating the maximum number of instances with a type of the first dependent system.

8. A non-transitory computer-readable medium, comprising executable instructions, wherein the instructions, when executed by at least one processor, cause at least one computing device to perform operations comprising:
receiving, by the computing device, a request to invoke a function provided as a function-as-a-service; (FaaS);
generating a request to obtain a state of a plurality of dependent systems in the FaaS infrastructure, each dependent system being a virtual computer implemented on a physical device using hypervisor software;
transmitting the request to a plurality of agents, each of the plurality of agents running on a respective dependent system of the plurality of dependent systems;
obtaining, from the plurality of agents, each of the plurality of responses indicating resource consumption in a respective dependent system of the plurality of dependent systems;
analyzing the plurality of responses from the plurality of agents determine whether the resources of the FaaS infrastructure are constrained;
based on a determination that the resources of the FaaS infrastructure are constrained, determining whether a number of dependent systems in the cluster is not at a maximum number;
based on a determination that the number of dependent systems in the cluster is not at a maximum number, adding to the cluster an additional dependent system comprising an additional VM by invoking an API to provision additional resources for the additional dependent system; and
generating a response to the request to invoke the function, the response to the request to invoke the function obtained from one of the plurality of dependent systems.

9. The non-transitory computer-readable medium of claim 8, wherein the resource consumption in each respective dependent system specifies system parameters of the respective dependent system, comprising: a number of running processes executing the function, a network utilization, a CPU utilization, or a memory utilization.

10. The non-transitory computer-readable medium of claim 8, the operations further comprising:
throttling the rate at which responses to requests submitted to the FaaS are generated.

11. The non-transitory computer-readable medium of claim 10, the operations further comprising:
determining that the number of dependent systems in the cluster is at the maximum number;
wherein throttling the rate at which responses to requests submitted to the FaaS are generated comprises:
throttling the rate in response to a determination that the number dependent systems in the cluster is at the maximum number.

12. The non-transitory computer-readable medium of claim 8, wherein:
receiving a request to invoke a function comprises:
receiving the request via an API call at an API gateway; and
generating a response to the request to invoke the function comprises:
invoking an ephemeral executing in a stateless container running as a workload on one of the dependent systems.

13. The non-transitory computer-readable medium of claim 8, the operations further comprising:
creating a new compute container on the additional dependent system for execution of the FaaS; and
executing the agent within the compute container.

14. The non-transitory computer-readable medium of claim 8, wherein the plurality of dependent systems comprises a first dependent system, the operations further comprising:
  determining a maximum number of instances of the function that may be executed concurrently on the first dependent system; and
  associating the maximum number of instances with a type of the first dependent system.

15. A method, comprising:
  receiving, by the computing device, a first request to invoke a function provided as a function-as-a-service (FaaS);
  generating, by the computing device, a second request to obtain a state of a plurality of dependent systems in a cluster providing infrastructure for the FaaS, each dependent system being a virtual computer implemented on a physical device using hypervisor software;
  transmitting, by the computing device, the second request to a plurality of agents, each of the plurality of agents running on a respective dependent system of the plurality of dependent systems;
  obtaining, by the computing device and from the plurality of agents, a plurality of responses to the second request, each of the plurality of responses indicating resource consumption in a respective dependent system of the plurality of dependent systems;
  analyzing, by the computing device, the plurality of responses from the plurality of agents to determine whether the resources of the FaaS infrastructure are constrained;
  determining, by the computing device and based at least in part on a determination that the resources of the FaaS infrastructure are constrained, whether a number of dependent systems in the cluster is at a maximum number;
  adding to the cluster, by the computing device and in response to a determination that the number of dependent systems in the cluster is not at a maximum number, an additional dependent system comprising an additional VM, by invoking an API to provision additional resources for the additional dependent system; and
  generating, by the computing device, a response to the first request to invoke the function.

16. The method of claim 15, wherein the resource consumption in each respective dependent system specifies system parameters of the respective dependent system, comprising: a number of running processes executing the function, a network utilization, a CPU utilization, or a memory utilization.

17. The method of claim 15, further comprising:
  throttling further comprises throttling the rate at which responses to requests submitted to the FaaS are generated.

18. The method of claim 17, further comprising:
  determining that the number of dependent systems in the cluster is at the maximum number;
  wherein throttling the rate at which responses to requests submitted to the FaaS are generated comprises:
    throttling the rate in response to a determination that the number dependent systems in the cluster is at the maximum number.

19. The method of claim 15, wherein:
  receiving a request to invoke a function comprises:
    receiving the request via an API call at an API gateway; and
  generating a response to the request to invoke the function comprises:
    invoking an ephemeral executing in a stateless container running as a workload on one of the dependent systems.

20. The method of claim 15, further comprising:
  creating a new compute container on the additional dependent system for execution of the FaaS; and
  executing the agent within the compute container.

* * * * *